United States Patent [19]
Fuentes et al.

[11] 3,903,158
[45] Sept. 2, 1975

[54] PROCESS FOR REDUCING THE BIURET CONTENT IN UREA

[75] Inventors: Jose Cabello Fuentes, Mixcoac; Ramon Xutgla Marin, Satelite, both of Mexico

[73] Assignee: Guanos y Fertilizantes de Mexico, S.A., Mexico

[22] Filed: May 16, 1973

[21] Appl. No.: 361,008

[52] U.S. Cl. ............................................. 260/555 B
[51] Int. Cl.² .......................................... C07C 126/00
[58] Field of Search ................................. 260/555 B

[56] References Cited
UNITED STATES PATENTS
3,151,156   9/1964   Marten et al. .................... 260/555 B OTHER PUBLICATIONS
"Chemical Abstracts," Vol. 58, pg. 9655h.
Kasahara, "Chemical Abstracts,", Vol. 78, pg. 159001h, (1973).
Kucheryavyl, "Chemical Abstracts,", Vol. 68, pg. 24908p, (1968).

Primary Examiner—Joseph E. Evans
Assistant Examiner—A. Siegel
Attorney, Agent, or Firm—Ladas, Parry, Von Gehr, Goldsmith & Deschamps

[57] ABSTRACT

The present invention refers to a process for reducing the biuret content of melted urea or urea in solution by placing said urea in contact with ion exchanging resins.

6 Claims, 2 Drawing Figures

PROCESS FOR REDUCING THE BIURET CONTENT IN UREA

BACKGROUND OF THE INVENTION

Heretofore a serious problem encountered in the manufacture of urea has been the biuret content in the end product. Biuret is an impurity of urea and it is a condensation product thereof, produced according to the following reaction:

$$2CO(NH_2)_2 \rightarrow NH_2CONH—CONH_2 + NH_3$$

The formation of biuret is a direct function of the temperature and the retention time, therefore, these circumstances are avoided in all processes used. However, in order to obtain prilled urea, the most commonly form found in the market, it is necessary to use a sufficiently concentrated and fluid solution that allows the formation of a prill with such a moisture content that it prevents the cakeing of the stored and/or packed product. In order to obtain a solution capable of being prilled, it is necessary to operate at high temperatures. Besides, the reprocessed end product is subjected once more to the necessary heating for prilling same, thus the biuret content increases again.

Urea is mainly used as an agricultural fertilizer, that in one of its usage techniques is dispersed on the foliage of growing plants; and in such an event the biuret is extremely noxious since it possesses a very active phytotoxic action. Therefore, in order to produce a foliar grade urea, that is, so that its solutions be dispersable in the leaves of the plants, it is necessary that same has a maximum biuret content of 0.2%.

In addition to the above mentioned use, urea has a great variety of different usages in which the requisite is a low biuret content. One of these usages is, for example, the employment of urea in the production of synthetic resins and plastics. Likewise, a small amount of urea is used in pharmaceutical products and, logically, for this usage there is a serious restriction in the biuret content as well as other impurities. On the other hand, urea is used in solutions for textile treating and finishing. In this event, the biuret contained in the urea, together with the formaldehyde necessary for the textile treating, causes turbidity in the solutions and consequently it destroys the brilliancy of the textile finish, this being totally undesirable.

The usual process of manufacturing urea consists of contacting ammonia and carbon dioxide at high pressures and temperatures in a closed system. In this manner, in the first place, ammonia and carbon dioxide are exothermically combined forming ammonium carbamate that, under the reaction conditions, is partially converted into urea and water. Subsequently, the resulting urea, ammonium carbamate, ammonia and water are treated by different processes in order to recover the ammonia and the carbon dioxide. Finally, the water is evaporated to obtain a relatively pure concentrated urea solution, which is subjected to a suitable process in order to obtain the desired final form of urea, for example, prilled urea. In this last step and according to the aforementioned comments made in respect to the heating, it is not possible to avoid an undesirable percentage of biuret content in the end product.

Various solutions have been proposed to avoid the formation of biuret. For example, a proposal was to mount the evaporator unit on the top of the prilling tower so as to immediately transfer the urea melt to the prilling operation. This process is disadvantageous since it requires special supports for the evaporator, as well as extra lines for the steam and the condensate.

Another process as a solution to the problem of the biuret formation, consisted of ammoniation of the solutions containing biuret to split the biuret molecule thus forming again urea. This process is not convenient because it is an expensive process, since it requires high pressures during a substantial period and, therefore, the appropriate equipment results uneconomical.

Another process for solving the problem of biuret formation in urea consisted of a partial crystallization of urea saturated solutions in order to provide relatively pure urea crystals, leaving most of the biuret in the mother liquors, and of a further reprocessing of said mother liquors through the reactor. However, this process has not yielded satisfactory results due to the fact that the recirculation of the mother liquors reduces the capacity of the urea plant and besides, the occlusion of biuret in the final urea crystals is not prevented.

Another process for the production of urea having a low biuret content consisted of evaporating ammonia, carbon dioxide and a certain amount of water and passing them rapidly through an externally heated tube. Then, the liquid and gas mixture evolving from the tube was processed to separate the gas from the liquid; and subsequently the liquid was passed through a packed tower in countercurrent flow to a stream of hot air, thereby providing a final drying of the urea. This final drying could be changed by the steps of crystallization and separation of crystals in a centrifuge. This process did not provide adequate results due to the several disadvantages it involves. That is, there was a premature crystallization resulting in plugging the apparatus; the decomposition products including biuret in the urea substantially increased due to long time high temperature evaporation; a high water content was found in the resulting product, therefore a subsequent drying step was required involving a consequent decomposition; there were losses of the desired product due to decomposition and the resulting granules of end product were either larger or smaller than the required size.

Finally, some other processes for solving the problem of the biuret contents have been proposed, for example, one of them involves treating solid urea with a liquid solvent containing acetone to extract biuret from the solid urea and others are only variations in operating pressures and temperatures or applying different crystallization conditions. Nevertheless these methods have not provided a suitable and efficient solution to the problem of biuret content in urea.

OBJECTS OF THE INVENTION

Therefore, it is an object of the invention, to provide a process for reducing the biuret content in urea, wherein no variation of operating temperatures or pressures are necessary, except than those of a common process for obtaining urea.

It is another object of the present invention to provide a process for reducing the biuret content in urea, that does not require any additional crystallization step.

It is an additional object of the present invention to provide a process for reducing the biuret content in urea, wherein no premature crystallization is obtained that might plug the apparatus.

It is another object of the present invention to provide a process for reducing the biuret content in urea, in which extra ammonia is not used in the last step of the process, in order to again convert biuret in urea.

It is another object of the present invention to provide a process for reducing the biuret content of urea whereby no end product losses by decomposition take place.

It is an additional object of the present invention to provide a process for reducing the biuret content in urea, which does not require to extract the biuret from the urea solution by a solvent.

It is another object of the present invention to provide a process for reducing the biuret content in urea, which does not require that the reaction mixture containing ammonia, carbon dioxide and water, be passed through a packed tower in countercurrent flow to a stream of hot air.

It is another object of the present invention to provide a process for reducing the biuret content in urea, that produces as end product foliar grade urea.

It is an additional object of the present invention to provide a process for reducing the biuret content in urea, whereby the biuret is totally reduced, that is, up to 0%.

Finally, it is another object of the present invention to provide a process for reducing the biuret content in urea, wherein urea is contacted with ion exchanging resins.

These and other objects obtained in the practice of the present invention will be better understood and appreciated by reading the following description referring to the drawings of preferred embodiments of the present invention.

DETAILED DESCRIPTION OF THE INVENTION

The present invention refers to urea of low biuret content and, more specifically, to a process for reducing the biuret content in urea by means of an ion exchange operation taking advantage of the property of biuret of being selectively retained by ion exchangers.

Molten urea or urea solutions of from 1.0 to 99.9% can be used in the process of the present invention, containing biuret as such, or complexed with any metal. Moreover, the type of the ion exchanger is indistinct, since any type works. However, ion exchangers capable of regeneration and operating at high temperatures (200°C.) are preferred; and from these, ion exchanging resins of a strong base anionic type.

Once the ion exchange operation has been carried out and the biuret has been separated from the urea, said biuret may be displaced from the resin by any stronger anion, for example, bicarbonates, carbonates, chlorides, nitrates, sulphates, and hydroxides. Nevertheless the preferred ones are the hydroxides because they are the only anions that totally displace the biuret, leaving the resin in conditions to again retain said biuret.

The aforementioned ion exchange can be carried out through a column containing the duly supported ion exchanging resin.

Figure 1:
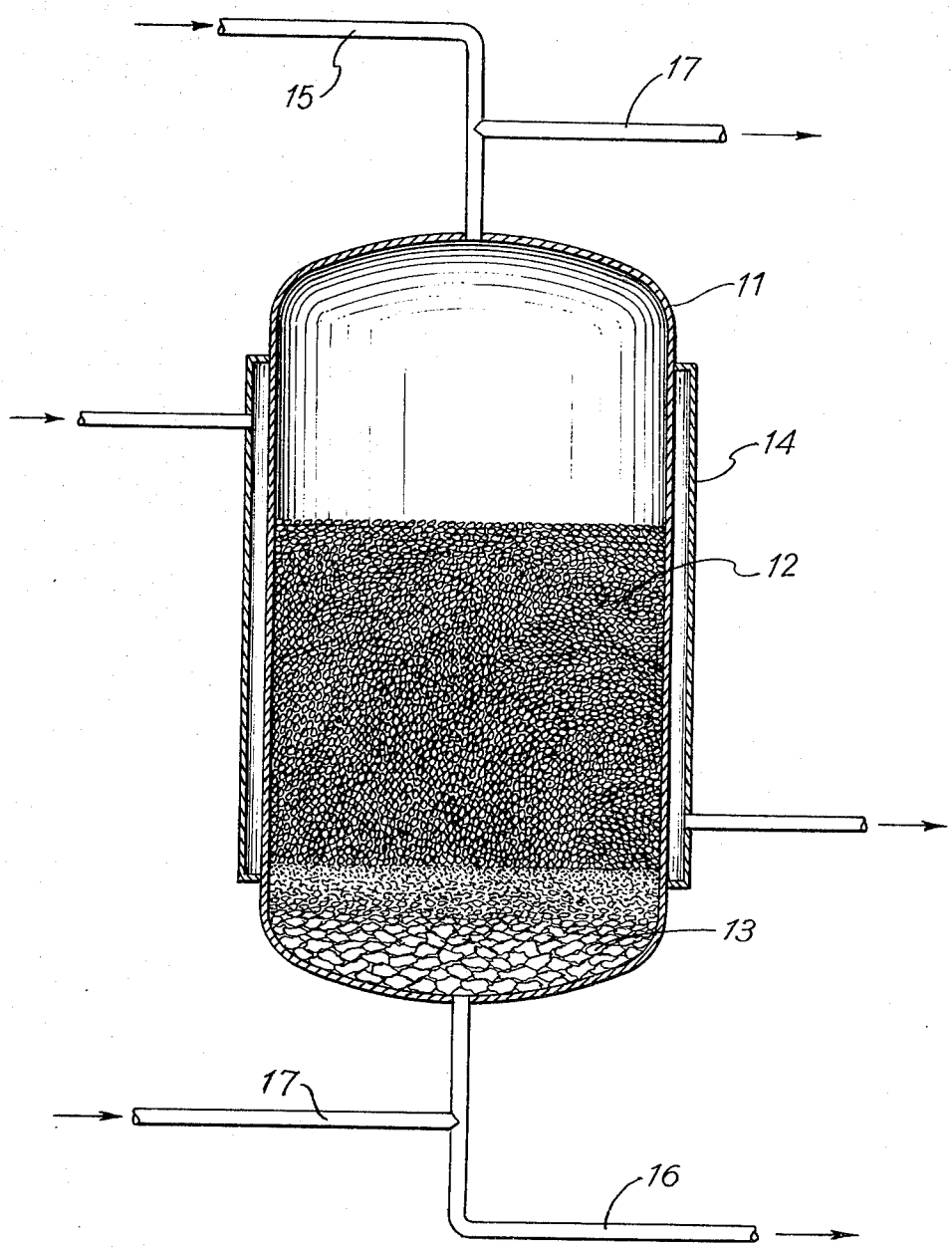
FIG. 1 is a schematic view illustrating an embodiment of the ion exchange system, used by the present invention.

In one of the embodiments of the present invention (see FIG. 1), a column 11 imbeds a strong basicity resin 12, for example, of the styrene type. The resin 12 is supported by means of graded sand 13 providing the adequate support, for avoiding leaks of said resin 12 during the exchange operation. The column 11 includes a surrounding jacket 14 through which low pressure steam passes for maintaining the required temperature, in order to avoid solidications of urea.

The volume of column 11 must be such as to include the graded sand 13, the ion exchanging resin 12 and to allow a clearance corresponding to 75% of the volume of resin 12 for not losing same during the processing operations.

In this type of ion exchangers, the feeding of the product to be treated is carried out through an upper line 15, including its corresponding distributor (not shown), in order to immediately contact said product to be treated with the ion exchanging resin 12. Once the product is processed, it exits from column 11 through a lower line 16.

The regeneration and rinse of the ion exchanging resin 12 are carried out likewise through lines 15 and 16. However, since a backwash is necessary, line 17 are included for introducing the backwashing liquid at the lower end of the column 11 and removing same through the upper end.

The process for reducing the biuret content in urea in this type of equipment can be carried out in the following manner:

The water necessary for keeping the resin 12 fully covered, is partly drained until it goes beyond the level of said resin 12, so as to prevent dilution of the urea solution and to avoid modification in the exchange operation by air bubbles due to excess drainage. The urea solution is fed through line 15 to column 11, thereby displacing the water retained in the ion exchanging resin 12, which water flows through line 16. Consequently, the liquid in the effluent at this time is essentially water, therefore it is eliminated through line 16 until when said liquid is an urea solution with concentration of 4 to 5%. Then, the outflowing urea solution, which is a biuret free urea solution, is recovered as an end product. This operation is maintained until, by means of a qualitative test, biuret is detected in the effluent; the test is considered positive when the biuret content exceeds 0.1%.

The presence of biuret in the effluent indicates that the ion exchanging resin 12 is exhausted. Therefore, an urea recovering operation, as well as the operations of backwash, regeneration and rinse of the ion exchanging resin 12, are necessary.

The urea recovering operation comprises feeding water through line 15 to column 11, to displace the urea solution retained in the ion exchanging resin 12. The liquid flowing through line 16 is a solution having a high urea content, therefore, it can be reprocessed. When the concentration of the urea solution in the effluent flowing through line 16 drops to 3 or 4%, said solution is considered as not being useful and this operation is concluded.

After the above operation, the backwash is performed. That is, the water flow is inverted passing it through lower line 17 and flowing out through upper line 17. When the backwash has been established, the rate of flow is increased for eliminating suspended solids and for raising the ion exchanging resin 12; this situation is kept for a certain interval of time in order to appropriately clean said resin 12.

After the backwash operation, the regeneration is initiated which, in this case will be carried out using caustic soda having a concentration of 15 to 45%. For this operation, the remaining water from the backwash operation, that necessarily entirely covers the resin 12 is drained until reaching the level of said resin 12; then the feeding of caustic soda is started through line 15. In this manner, the water contained in the ion exchanging resin 12 is displaced flowing out by line 16. The first amount of outflowing liquid is eliminated for being totally the last backwash water, until it reaches a concentration of about 3% of caustic soda. Once this concentration is reached, the effluent liquid is recovered, maintaining the regeneration operation according to the type of ion exchanging resin 12 embedded in column 11.

According to the above, it can be considered that the ion exchanging resin 12 has been regenerated. But, it is necessary to recover the caustic soda still contained in said ion exchanging resin 12 and this is carried out by a water displacement that is continued until the effluent through line 16 has a caustic soda concentration of 3%. At this time, the effluent liquid is eliminated and the introduction of water is continued with an increased flowing rate. This operation is considered as a rinse operation and same is ended when the effluent contains 500 p.p.m. of caustic soda. In this manner, the ion exchanging resin 12 is ready for a new operating cycle.

As can be seen from the above, with this type of ion exchangers, the process results a batch process since the recovery, backwash, regeneration and rinse operations are required. If a continuous operation is desired, it will be necessary to have duplicate ion exchanging columns so that, while in one of them the urea solution is processed in the other the several different operations can be performed.

Figure 2:
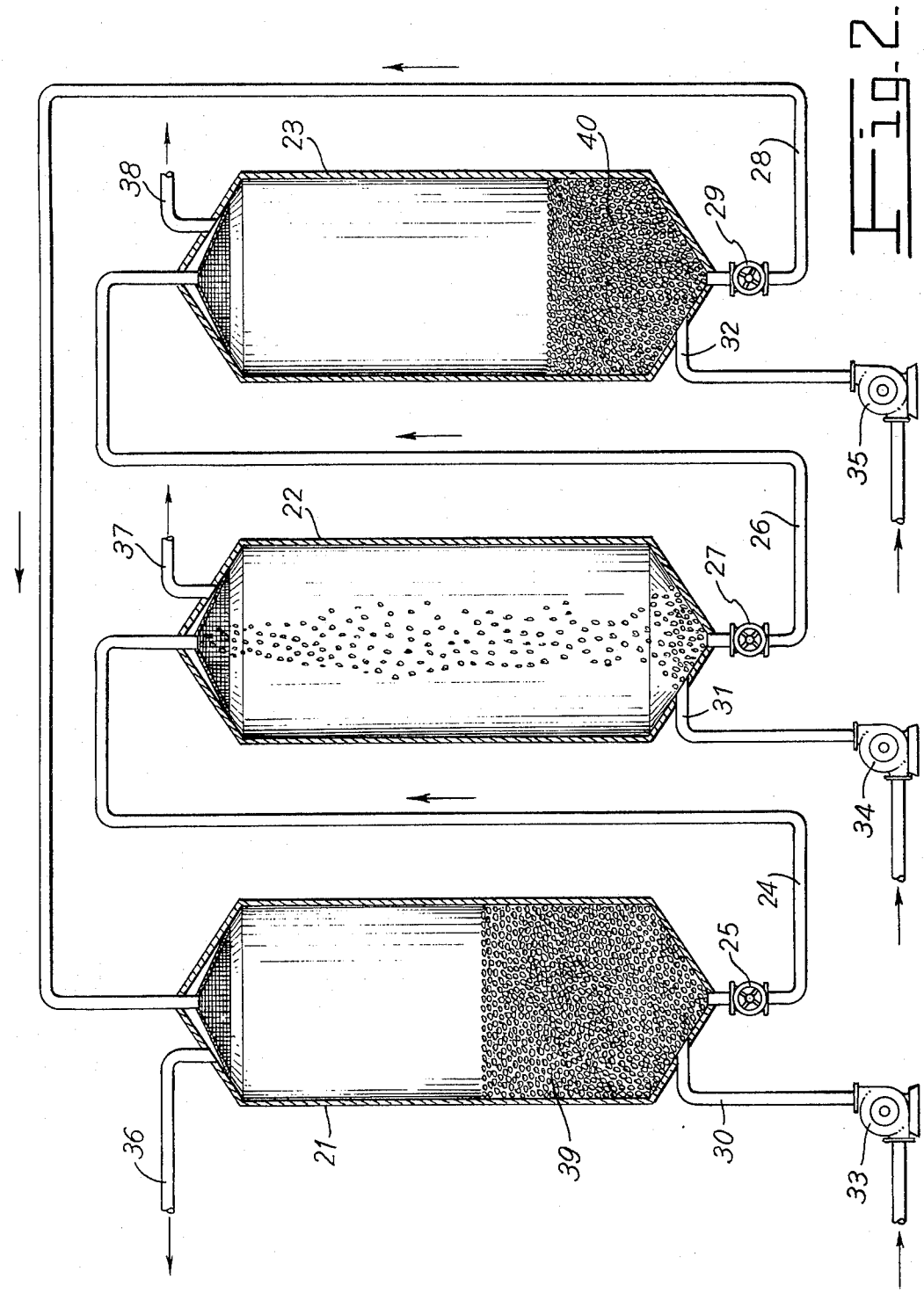
FIG. 2 is a schematic view illustrating another embodiment of the ion exchange system, that can be used in the process of the present invention.

Another possible embodiment of the process of the present invention can be carried out (see FIG. 2) by means of a continuous exchange system. In this system three columns 21, 22 and 23 are located in such a manner that column 21 is connected at its lower end to column 22 by means of line 24, including its respective valve 25; besides said column 22 is connected at its lower end to column 23 by means of line 26, also including its respective valve 27; and that colum 23 is connected at its lower end to column 21 through line 28 including valve 29, with which a continuous recycling system is obtained.

Moreover, each column 21, 22 and 23 comprises at its lower end, feeding inlets 30, 31 and 32 through which, by means of pumps 33, 34 and 35, the corresponding liquids to be fed to said each column 21, 22 and 23 are introduced. Likewise, at its upper ends, columns 21, 22 and 23 include outlet lines 36, 37 and 38 through which the liquids fed to each column 21, 22 and 23 are flown out.

In this type of equipment we find, for example, that column 21 contains a certain amount of an ion exchanging resin 39, which can be of the same type as in the case of the batch operation, that is, a strong basicity styrene resin. Then, through inlet 30 urea solution containing biuret is pumped for contacting the ion exchanging resin 39 whereby, through line 36, a biuret free urea is obtained. The pumping operation is thus continued until when it is considered that a sufficient amount of resin 39, not in its total, has been exhausted. This interval of time will be taken as a standard for further operating cycles.

After the selected period has elapsed, a certain amount of exhausted resin 39 is transferred from column 21 to column 22; allowing at the same time that a corresponding amount of a regenerated resin 40, embedded in column 23, be transferred to column 21 for keeping the the total volume of resin in said column 21, constant.

Regeneration of exhausted resin 39 in column 22 is carried out using caustic soda. Said caustic soda is pumped through inlet 31 and flown out through outlet line 37 keeping a flow during a suitable period for regenerating exhausted resin 39.

After the resin 39 has been regenerated, same is passed through line 26 to column 23 wherein it is subjected to a rinse operation. This rinse operation is carried out introducing water to said column 23, through inlet 32 and by using pump 35 and flowing out of same, said water through line 38. The water flow is continued during the time necessary for displacing almost all the caustic soda retained in the resin 39. In this manner, a washed and regenerated resin 40 is provided, that is ready for reuse in column 21, as previously indicated.

The above mentioned systems may be adapted or included in urea synthesis plants for obtaining an end product with a very low biuret content. The location of the ion exchange systems in the urea synthesis plants is not critical, even in intermediate steps, provided the required final biuret content in the urea is taken into account.

The efficiency of the process of the present invention shall be illustrated by the following examples:

LABORATORY EXAMPLES

Various ion exchanging resins were used for determining which resulted the most appropriate and the urea solutions were prepared from non-coated prilled urea.

EXAMPLE 1

A 50% urea solution containing 1.17% of biuret on dry urea basis, was treated with 150 mililiters of a cationic resin Amberlite IR-120. The obtained results are shown in Table I.

EXAMPLE 2

Tests were carried out treating a 50% urea solution containing 1.17% of biuret on dry urea basis, with 150 mililiters of a weak anionic resin IRA-93. The obtained results are shown in Table II.

EXAMPLE 3

Several tests were carried out treating a 50% urea solution containing 1.12% of biuret on dry urea basis, with 200 mililiters of a strong anionic resin SBR-P. The obtained results are shown in Table III.

EXAMPLE 4

A 50% urea solution containing 1.15% of biuret on dry urea basis was treated with 200 mililiters of an extra strong anionic resin IONAC-935. The results obtained in this example did not indicate the presence of biuret until 1600 mililiters of the urea solution had passed through the bed. That is, during the passage of the above mentioned mililiters up to this value, the percentage of biuret on dry urea basis in the effluent, is considered of 0%.

TABLE I

| Ml. of urea solution passed through the bed | 100 | 200 | 300 | 400 | 500 |
|---|---|---|---|---|---|
| % of biuret on dry urea basis, in the effluent | 0.69 | 0.95 | 1.07 | 1.11 | 1.16 |
| Regeneration | With a 4% hydrochloric acid solution and a regeneration level of 9 lbs. HCl/ft³ of resin. | | | | |

TABLE II

RUN 1

| Ml. of urea solution passed through the bed | 100 |
|---|---|
| % of biuret on dry urea basis, in the effluent | 0.62 |
| Regeneration | With a 4% caustic soda solution and a regenerating level of 5 lbs NaOH/ft³ of resin. |

RUN 2

| Ml. of urea solution passed through the bed | 100 | 200 |
|---|---|---|
| % of biuret on dry urea basis in the effluent. | 0.11 | 0.77 |
| Regeneration | With a 4% caustic soda solution and a regeneration level of 5 lbs. of NaOH/Ft³ of resin. | |

NOTE:
Ammonia and sodium hydroxide were added until the pH was 13.4 at which time the biuret is subject to complex.

TABLE III

RUN 1

| Ml. of urea solution passed through the bed | 100 | 200 | 300 | 400 | 500 | 600 | 700 | 800 | 900 |
|---|---|---|---|---|---|---|---|---|---|
| % of biuret on dry urea basis in the effluent | 0.05 | 0.08 | 0.08 | 0.08 | 0.08 | 0.08 | 0.09 | 0.10 | 0.10 |
| Regeneration | With a 4% caustic soda solution and a regeneration level of 5 lbs. NaOH/ft³ of resin. | | | | | | | | |

RUN II

| Ml. of urea solution passed through the bed | 100 | 200 | 300 | 400 | 500 | 600 | 700 | 800 | 900 | 1000 |
|---|---|---|---|---|---|---|---|---|---|---|
| % of biuret on dry urea basis, in the effluent | 0.25 | 0.36 | 0.36 | 0.36 | 0.35 | 0.35 | 0.35 | 0.36 | 0.46 | 0.74 |
| Regeneration | With a 4% ammonia solution and a regeneration level of 5 lbs. NH₃/ft³ of resin. | | | | | | | | | |

RUN 3

| Ml. of urea solution passed through the bed | 100 | 200 | 300 | 400 | 500 | 600 | 700 | 800 | 900 | 1000 |
|---|---|---|---|---|---|---|---|---|---|---|
| % of biuret on dry urea basis, in the effluent | 0.18 | 0.25 | 0.26 | 0.32 | 0.38 | 0.52 | 0.76 | 0.91 | 1.01 | 1.07 |
| Regeneration | With a 4% ammonia solution and a regeneration level of 10 lbs NH₃/ft³ of resin. | | | | | | | | | |

RUN 4

| Ml. of urea solution passed through the bed | 100 | 200 | 300 | 400 | 500 | 600 | 700 | 800 | 900 |
|---|---|---|---|---|---|---|---|---|---|
| % of biuret on dry urea basis, in the effluent | 0.11 | 0.11 | 0.09 | 0.08 | 0.08 | 0.08 | 0.09 | 0.08 | 0.10 |
| Regeneration | With a 4% caustic soda solution and a 4% ammonia solution, and with regeneration levels respectively of 2.5 lbs. NaOH/ft³ of resin and 5 lbs. NH₃/ft³ of resin. | | | | | | | | |

PILOT PLANT EXAMPLE

From laboratory examples it was determined that the resin providing the best results is definitely the extra strong anionic type, such as IONAC-935. Therefore, in a pilot plant, the runs were only carried out with extrastrong anionic resin IONAC-935. The results obtained are shown in Table A.

The concentration of biuret relative to urea on a dry weight basis is determined in the usual manner as follows:

$$\% \text{ biuret (dry basis)} = \frac{\text{weight of biuret} \times 100}{\text{weight of urea} + \text{weight of biuret}}$$

Thus for Run 1 of Table A $$\% \text{ biuret (dry basis)} = \frac{1.88 \times 100}{62.5 + 1.88} = 2.92\%$$

TABLE A

| Run | Capacity Kg Biuret M³ resin | Treated Urea Solution | | | Operating temperature, °C. | Final Biuret, % |
|---|---|---|---|---|---|---|
| | | Vol. M³ | Concentration % Urea | Biuret | | |
| 1 | 30.38 | 1.40 | 62.5 | 1.88 | 57 | 0 |
| 2 | 31.55 | 1.45 | 62.5 | 1.88 | 57 | 0 |
| 3 | 32.50 | 1.50 | 62.5 | 1.88 | 57 | 0 |
| 4 | 32.45 | 2.7 | 58.5 | 0.89 | 55 | 0 |
| 5 | 42.4 | 2.3 | 56.5 | 1.36 | 38 | 0 |
| 6 | 49.07 | 3.25 | 54.5 | 1.12 | 40 | 0 |
| 7 | 29.19 | 2.1 | 66 | 1.01 | 56 | 0 |
| 8 | 34.55 | 4.6 | 51 | 0.56 | 26 | 0 |
| 9 | 27.25 | 3.7 | 55 | 0.55 | 29 | 0 |

We claim:

1. A process for preferentially reducing any undesirable biuret content in urea having a low amount of biuret in the range of 2.92 per cent or less on a dry weight basis as an impurity relative to said urea, said urea comprising either molten urea or urea in aqueous solution having concentrations of 1.0 to 99.9% of urea, in which said molten urea or said urea in solution is placed in contact with acidic or basic ion exchangers.

2. The process as claimed in claim 1, wherein the ion exchanging resin is a strong base anionic resin.

3. The process as claimed in claim 2, wherein the operating temperature for said biuret reduction is within the range of 0° to 200°C.

4. The process as claimed in claim 3, which is carried by batch ion exchange.

5. The process as claimed in claim 3, which is carried out by continuous ion exchange.

6. The process according to claim 1 wherein said urea is in a substantially saturated solution of urea in water.

* * * * *

REEXAMINATION CERTIFICATE (166th)

United States Patent [19]
Fuentes et al.

[11] B1 3,903,158

[45] Certificate Issued Feb. 21, 1984

[54] PROCESS FOR REDUCING THE BIURET CONTENT IN UREA

[75] Inventors: Jose C. Fuentes, Mixcoac; Ramon X. Marin, Satelite, both of Mexico

[73] Assignee: Guanos y Fertilizantes de Mexico, S.A., Mexico

Reexamination Request:
No. 90/000,218, Jun. 16, 1982

Reexamination Certificate for:
Patent No.: 3,903,158
Issued: Sep. 2, 1975
Appl. No.: 361,008
Filed: May 16, 1973

[51] Int. Cl.$^3$ ............................................. C07C 126/00
[52] U.S. Cl. ....................................................... 564/73
[58] Field of Search ........................................ 564/73

[56] References Cited
U.S. PATENT DOCUMENTS
2,865,960  12/1958  Shearer, Jr. et al. ................ 564/206

OTHER PUBLICATIONS

Takahashi et al., "Soil and Plant Food", vol. 3, No. 3, pp. 142–144 (1958).
Geurts et al., "Analytica Chimica Acta.", vol. 41, pp. 113–120 (1968).
Rohm and Haas, "Ion Exchange with the Amberlite Resins", pp. 1–14, Nov. 1960 Edition.
Rohm and Haas, "Amberlite IRA–400 Product Bulletin IE–16–56" pp. 1–8, revised Apr. 1956.

*Primary Examiner*—Robert V. Hines

[57] ABSTRACT

The present invention refers to a process for reducing the biuret content of melted urea or urea in solution by placing said urea in contact with ion exchanging resins.

REEXAMINATION CERTIFICATE ISSUED UNDER 35 U.S.C. 307.

THE PATENT IS HEREBY AMENDED AS INDICATED BELOW.

AS A RESULT OF REEXAMINATION, IT HAS BEEN DETERMINED THAT:

Claims 1–6, having been finally determined to be unpatentable, are cancelled.

* * * * *